May 5, 1936.  M. ROMAINE ET AL  2,039,349

PLANETARY MILLING MACHINE

Filed Sept. 12, 1933  5 Sheets-Sheet 1

Inventor
MILLARD ROMAINE
ERWIN G. ROEHM

By H. K. Parsons
Attorney

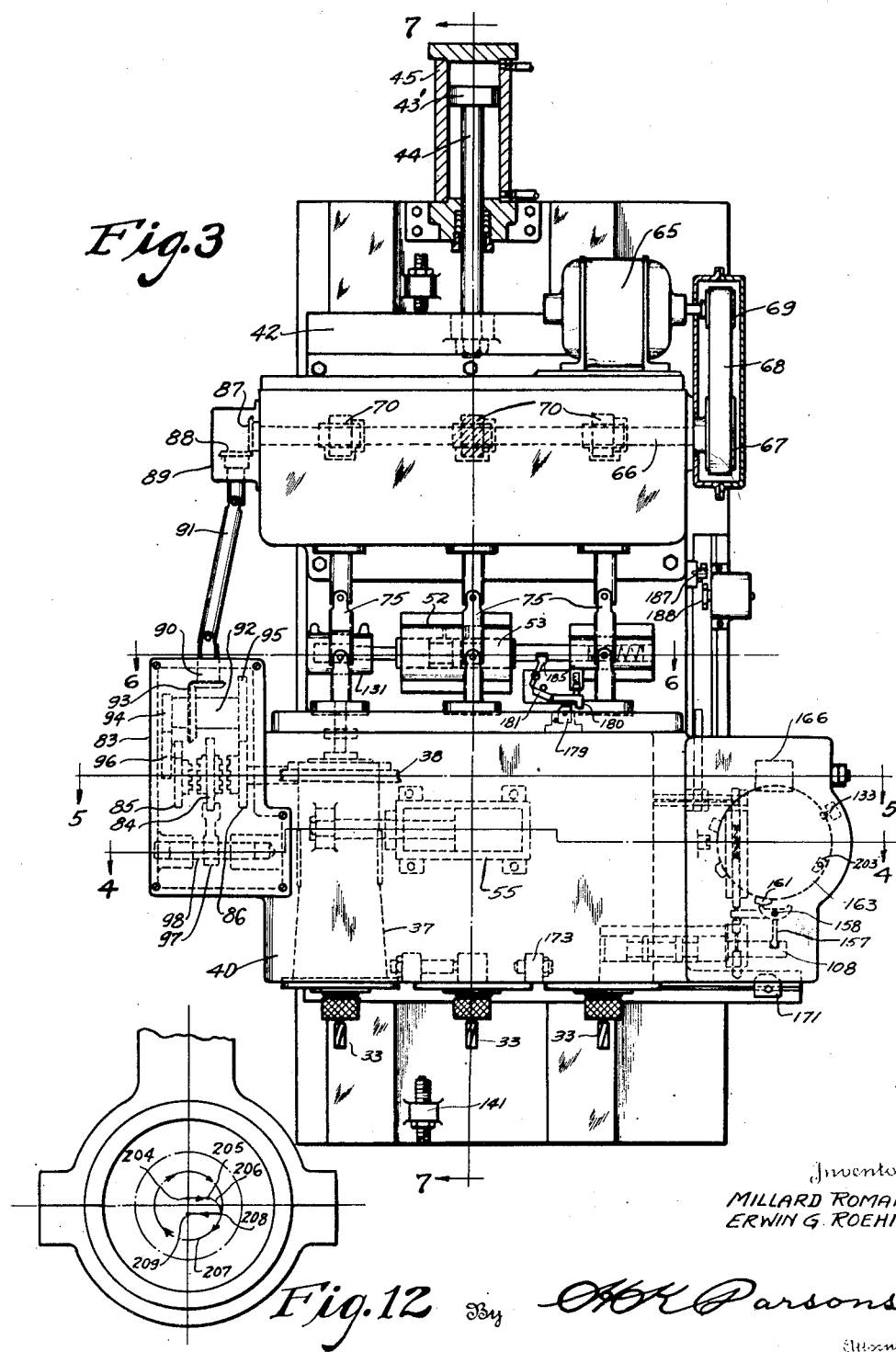

May 5, 1936.　　　M. ROMAINE ET AL　　　2,039,349
PLANETARY MILLING MACHINE
Filed Sept. 12, 1933　　　5 Sheets-Sheet 3
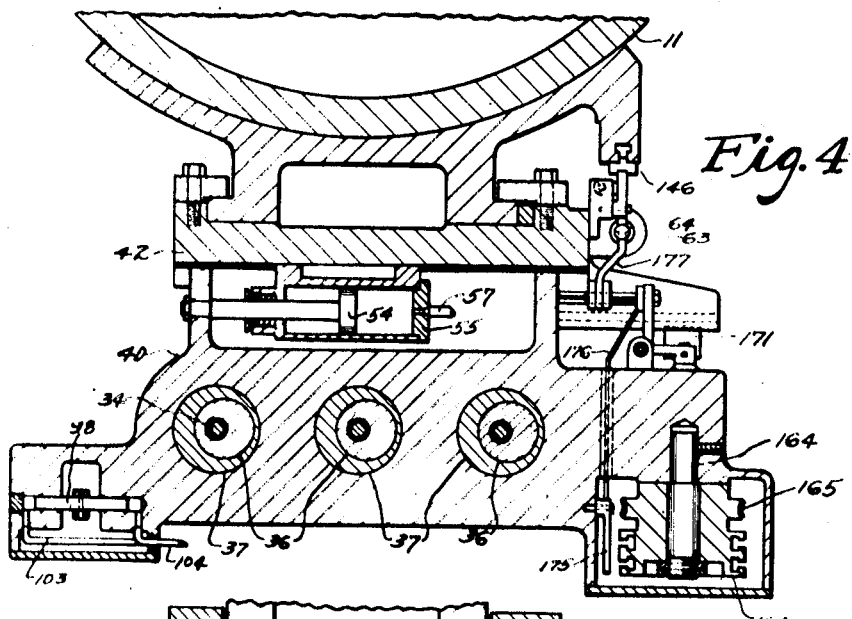
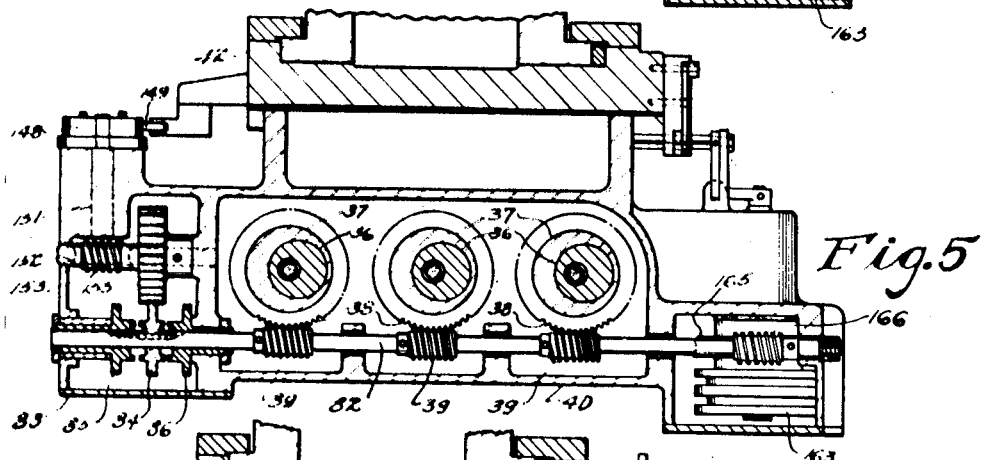
Inventor
MILLARD ROMAINE
ERWIN G. ROEHM
By
H. K. Parsons, Attorney

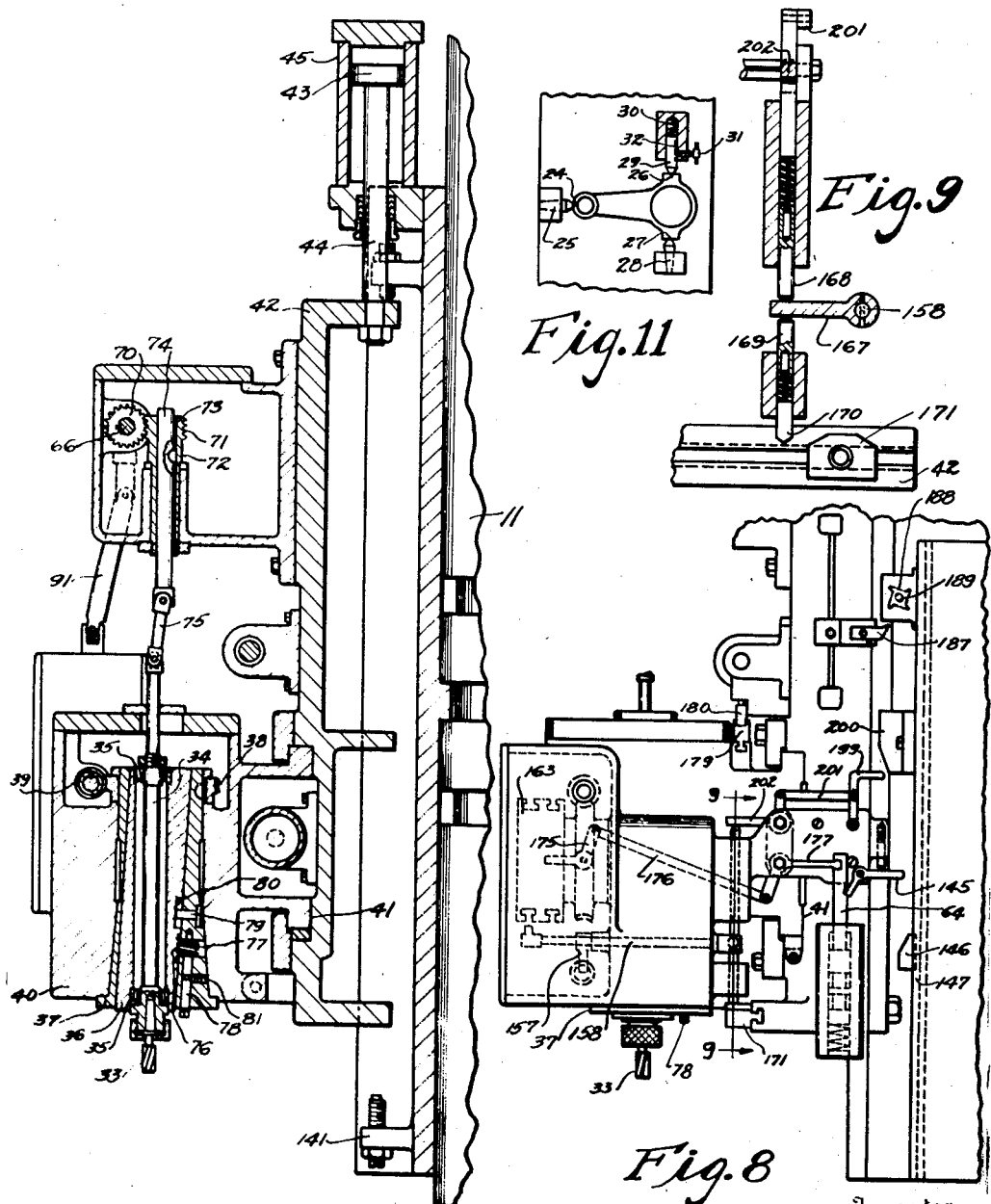

Patented May 5, 1936

2,039,349

UNITED STATES PATENT OFFICE 2,039,349

PLANETARY MILLING MACHINE

Millard Romaine, Cincinnati, and Erwin G. Roehm, Norwood, Ohio, assignors to The Cincinnati Milling Machine Company, Cincinnati, Ohio, a corporation of Ohio Application September 12, 1933, Serial No. 689,110

18 Claims. (Cl. 90—19)

This invention relates to machine tools and more particularly to an improved automatic planetary milling machine.

It is conventional practice to use a station-to-station type of machine tool when high production is desired and the character of the work permits its use, because such practice permits the operator to unload and load one group of work pieces during the tooling operation on another group of pieces thereby insuring almost continuous use of the machine.

One of the objects of this invention is the provision of means for the accomplishment of planetary milling operations on a station-to-station type of machine tool.

Another object of this invention is to provide in combination with an indexible support of a machine tool, a planetary operated tool head which is automatically operable upon the work between each indexing movement of the support. A further object of this invention is the provision of an improved operating and control mechanism for coordinating the movements of an indexible support and planetary milling head whereby each will automatically initiate movement of the other and all positioning movements will be rapidly and accurately made.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed within the scope of the appended claims, without departing from or exceeding the spirit of the invention.

Referring to the drawings in which like reference numerals indicate like or similar parts:

Figure 3 is an enlarged front elevation partly in section of the vertical slide and mechanism carried thereby.

Figure 4 is a section on the line 4—4 of Figure 3.

Figure 5 is a section on the line 5—5 of Figure 3.

Figure 6 is a section on the line 6—6 of Figure 3.

Figure 7 is a section on the line 7—7 of Figure 3.

Figure 8 is an end view of the horizontal slide showing the control mechanism carried thereby.

Figure 9 is a detail sectional view on the line 9—9 of Figure 8.

Figure 11 is a detail view of a work holder.

Figure 12 is a diagrammatic view showing the path of relative movement between the cutter and work.

Figure 1:
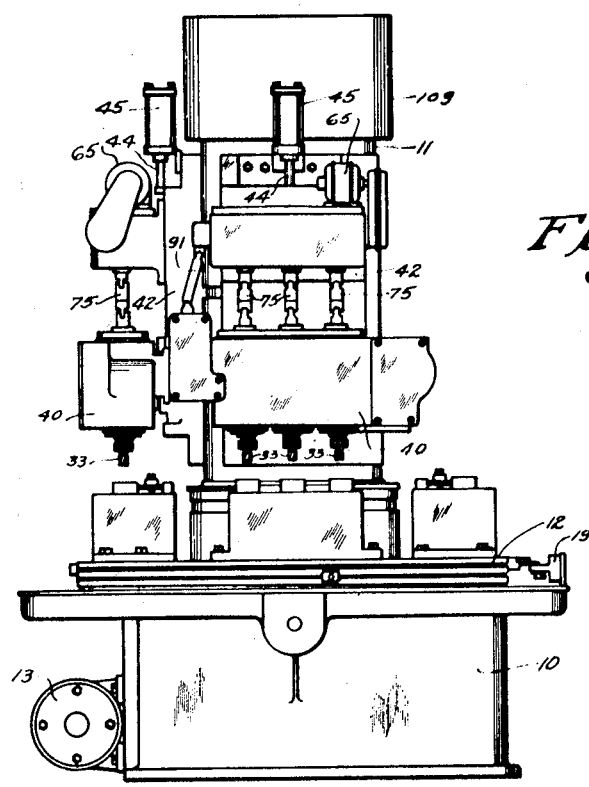
Figure 1 is a front elevation of a machine embodying the principles of this invention.
Figure 2:
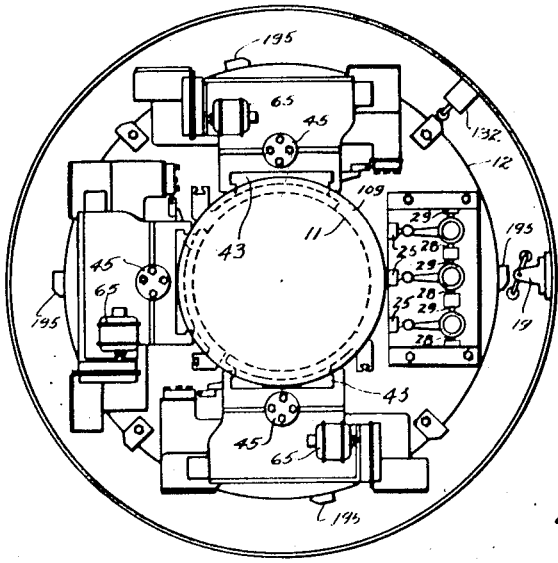
Figure 2 is a plan view of the machine shown in Figure 1.

One form of machine for carrying out a station-to-station method of operation is shown in Figures 1 and 2, and comprises a bed 10 having a central column 11 rising therefrom, the bed also supporting a table 12 for rotation about the column. In continuous milling the table may be rotated at a slow speed during the cutting operation and the work so spaced thereon as to form a more or less continuous procession of work under the cutter, or the work may be spaced in groups and the table intermittently rotated or indexed to present successive groups of work to the cutter. The latter method is more suitable for planetary milling operations and therefore a suitable indexing mechanism may be provided for intermittently positioning or indexing the table. Since such mechanisms are well-known and do not form a part of the present invention, only the control means therefor is illustrated in order to show more clearly the timed relation of its operation with respect to the other movements of the machine, it being understood that any suitable conventional type may be used.

As shown in Figure 1, a prime mover, such as an electric motor 13, may be operatively connected to the indexing mechanism through a worm 14 and worm wheel 15. The control of the successive indexing movements may be obtained by providing switching mechanism for directly starting and stopping the electric motor; or the motor may be continuously rotated and a power operated clutch (not shown) interposed between the motor and the worm 14 for connecting and disconnecting the power to the indexing mechanism. The former construction is more particularly illustrated in Figure 10 in which one lead 16 of the motor is directly connected to the power main 17. The other lead 18 of the motor is connected through a first control switch 19 and selectively in series with one or the other of a pair of control switches 20 and 21, which are jointly connected by the line 22, to the other power main 23. In the construction shown, the switch 19 is utilized for stopping the indexing movement of the table, and the switches 20 and 21 are utilized for initiating or starting said movement.

As an example of a work piece upon which a planetary milling operation may be performed by means of this machine, there is shown in Figures 1, 2 and 11 a connecting rod having a crank pin bearing at one end which is to be finished by planetary milling. Means are provided for supporting groups of these pieces on the work table for simultaneous finishing. Each work piece has a center hole 24 in one end adapted to be engaged by a reciprocable center 25; and a pair of center holes 26 and 27 on diametrically opposed sides of the bearing and in a plane at right angles to the axis of the connecting rod. A fixed locating center 28 is adapted to engage the center hole 27 and an adjustable center 29 inserted in the center hole 26. The adjustable centers may be provided with conventional springs 30 for normally holding them in an extended position. A clamp bolt 31 engaging detents 32 may be provided for locking the centers.

A plurality of cutters equal in number to the number of work pieces are provided at one station of the machine for milling the bearings while other tools may be provided at other stations for effecting a different operation on the work. As shown in Figure 7, these cutters, such as 33, may be supported by well-known chuck means in the end of a rotatable spindle 34 which is anti-frictionally mounted at opposite ends 35 in adjustable quill 36. The quill is mounted in a rotatable sleeve 37 having a worm wheel 38 secured to the upper end thereof in mesh with a worm 39.

The cutter spindles are carried by a horizontal slide 40 which is guided at 41 in a vertically reciprocable slide 42. This slide is mounted on guideways 43 formed on the face of the column 11 for downward movement to position the cutters in the bearing or hole in the work; and for upward movement to withdraw the cutter from the work during indexing of the table to present a new group of pieces to the cutters.

The vertical slide is moved by a piston 43′ operatively connected to the slide by a piston rod 44, the piston being reciprocably mounted in a cylinder 45 which is fixed with the column. Ports 46 and 47 at opposite ends of the cylinder are connected by the respective channels 48 and 49 to ports 50 and 51 of the control valve 52 having a valve plunger 53 reciprocably mounted therein.

The horizontal slide 41 is reciprocated by relative movement between a piston 54 and cylinder 55, one of which is connected, as by the rod 56, to the slide 41. This cylinder has a pair of ports 57 and 58 at opposite ends thereof which are connected by channels 59 and 60 to the ports 61 and 62 formed in the slide control valve 63 having the reciprocable valve plunger 64 contained therein.

The cutter spindles are rotated by a prime mover 65, which may be mounted on the vertical slide, and connected to the spindles through the following mechanism. A horizontal shaft 66 is journaled for rotation in the vertical slide and has a pulley 67 at one end connected by suitable motion transmitting means, such as the belt 68, to the motor pulley 69. Secured to this shaft are a plurality of spiral gears 70, one for each spindle, meshing with similar spiral gears 71 secured to the end of rotatable sleeves 72. Each sleeve 72 has a splined bore 73 for receiving the spline shaft 74 which is connected by the universal coupling 75 to the upper end of a cutter spindle 34. The purpose of the spline connection is to permit horizontal movement of the slide relative to the fixed support for the sleeve 72 without interrupting the transmission of motion to the spindles and also to permit axial adjustment of the cutter spindle in the horizontal slide.

This axial adjustment is effected by the quill 36 which is mounted in the sleeve 37 with its axis at an angle to the axis of the sleeve. The quill 36 has conventional rack teeth 76 formed in the periphery thereof which mesh with an operating worm 77 secured to the end of a rotatable shaft 78. A pin 79 mounted in the sleeve extends into a slot 80 formed in the quill for preventing relative rotation therebetween. Upon rotation of the shaft 76 the quill will be moved axially but it will be noted that the axis of the spindle is parallel to the axis of the sleeve so that axial movement of the quill in effect causes a lateral movement of the spindle 35. By means of this adjustment it is possible to vary the diameter of the planetary milling path of the cutter 33 and thereby adjust the machine for different sizes of work.

After this adjustment is made the spindle 76 is clamped by the set screw 81. Having determined the offset of the axis of the cutter spindle relative to the axis of the sleeve, the latter may now be rotated to effect the planetary movement of the cutter. This rotation is imparted by the shaft 82, Figure 5, to which all of the worms 39 are secured. This shaft extends into a bracket 83 attached to one end of the horizontal slide which contains a shiftable clutch gear 84 splined on the shaft 82. A pair of gears 85 and 86 are mounted for free rotation on the shaft 82 but secured in the bracket against axial movement. These gears are rotated in opposite directions by means of the following mechanism.

The end of shaft 66 is provided with a bevel gear 87 meshing with a similar bevel gear 88 mounted for rotation in a bracket 89 carried by the vertical slide. This gear is connected to bevel gear 90 carried by the relatively movable bracket 83 by means of a universal coupling 91. A shaft 92 journaled in the bracket 83 has a bevel gear 93 secured medially thereof in mesh with the bevel gear 90; a pinion gear 94 secured to one end and a spur gear 95 secured to the other end. The gear 95 meshes directly with gear 86 to rotate the same at a fast rate and in the one direction. The gear 94 is connected through the intermediate reduction gearing 96 to the other gear 85 for rotating the same at a slow speed and in a direction opposite to the direction of gear 86. The intermediate clutch gear 84 has clutch teeth on opposite faces thereof for intermeshing with similar clutch teeth formed on the faces of gears 85 and 86. A shifter fork 97 secured to the shifter rod 98 embraces the gear 84 for shifting the same into either one of its operative positions, as well as to a central or inoperative position.

Figure 10:
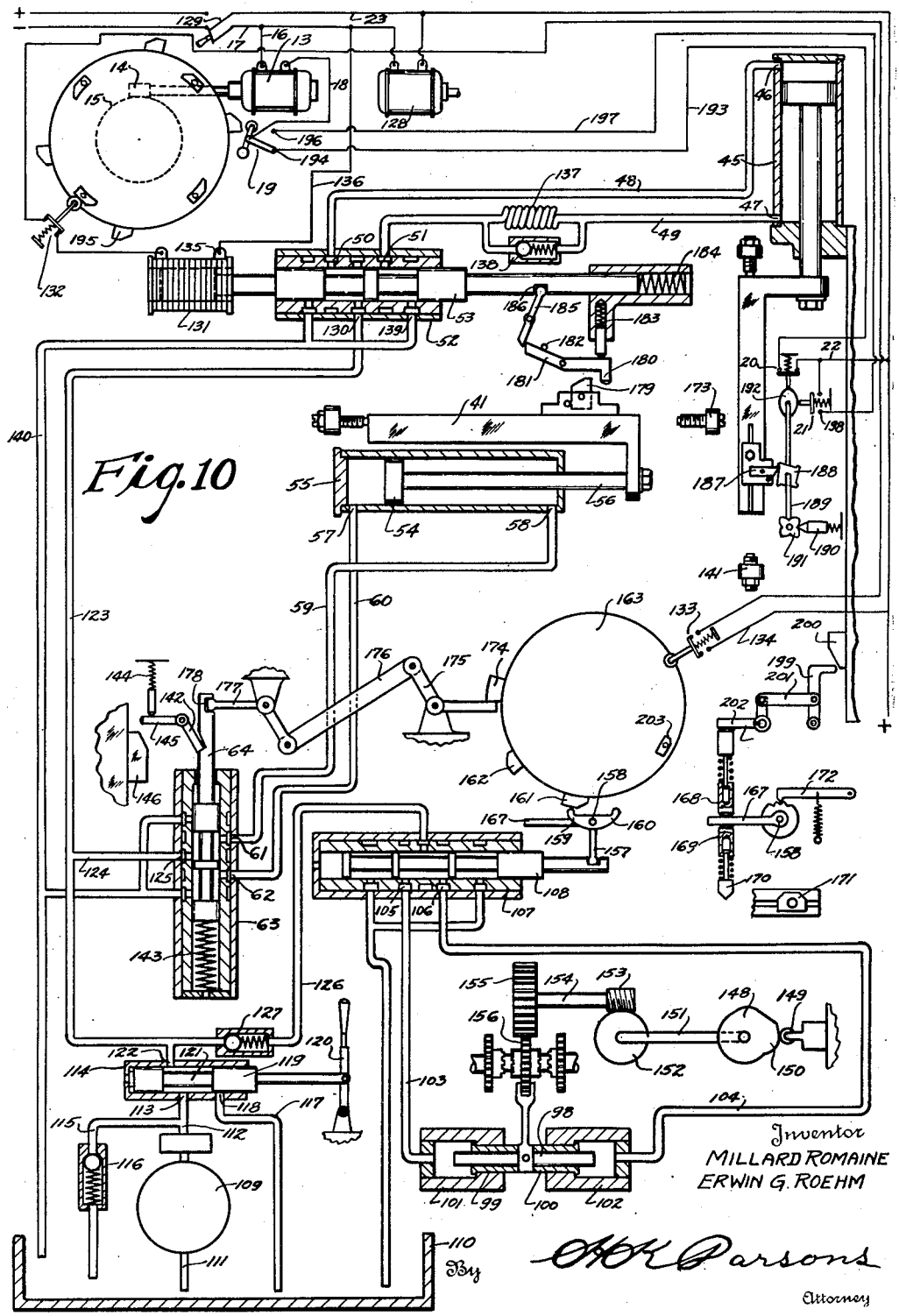
Figure 10 is a diagrammatic view of the hydraulic and electrical control circuits.

As shown in Figure 10, the shifter rod 98 has a pair of relatively movable sleeves 99 and 100 on opposite ends thereof which are slidably mounted in cylinders 101 and 102. These cylinders are connected by channels 103 and 104 respectively to ports 105 and 106 in the clutch control valve 107 having the valve plunger 108 reciprocably mounted therein.

The cycle of operation of the machine will best be understood by reference to Figure 12. After the table is indexed to present a new group of work pieces to the cutter, the vertical slide moves downward to position the center of the cutters at the point 204. Lateral movement of the slide 40 will advance the cutters to the point 205. A profiled cam now controls the movement of the slide and the planetary heads are set into operation to bring the cutters into the work. The resultant of these two motions is a curve represented by the arc 206. The horizontal slide finally engages a positive stop and the heads make a complete revolution represented by the circular path 207 to mill the work. There will be a slight overlap as represented at 208 after which the horizontal slide will return with the heads stopped to point 209 for withdrawal from the work preparatory to another indexing movement.

Fluid pressure is supplied to the hydraulic system from a pump 109 which draws fluid from a reservoir 110 through channel 111 and delivers it under pressure through channel 112 to the pressure port 113 of the stop valve 114. The line 112 has a branch return line 115 leading to reservoir in which is mounted a relief valve 116. The stop valve has a return line 117 connected to port 118. The stop valve plunger 119 which is connected to the pivoted lever 120 for manual operation has a cannelure 121 formed therein of sufficient length to interconnect ports 113 and 118 and thus by-pass the pump 109 to reservoir when it is desired to stop operation of the machine. When the valve is shifted to its left hand position or in other words, to the position shown in Figure 10, the pressure port 113 is disconnected from port 118 and connected to port 122 having the channel 123 leading therefrom to the vertical slide control valve. This channel has a branch line 124 leading to the pressure port 125 of the horizontal slide control valve 63. A second branch line 126 is connected to channel 123 through the reducing valve 127.

The pump 109 is continuously driven by an electric motor or other prime mover 128, which is operated whenever the main switch 129 is closed. Whenever it is desired to stop the machine, the operator throws the stop valve control lever 120 to the right of the position shown in Figure 10 thereby cutting off fluid to the valve 52 so that after the indexing operation has been completed and the valve plunger 53 is shifted, there will be no fluid pressure to continue operation of the machine. The main switch 129 is then opened to stop the pump 109. Assuming that the machine was stopped in the manner suggested and that the main switch has been closed to effect operation of the pump, the operator shifts the stop valve 119 to the position shown in Figure 10 whereby fluid will be delivered through channel 123 to the pressure port 130 of the vertical slide control valve which has been shifted to the position shown in Figure 10 by the electric solenoid 131 the circuit to which was closed by the trip operated switch 132 which is in series with a switch 133, one pole of which is connected by line 134 to the main line 23, the other terminal 135 of the solenoid being connected by line 136 to the other power main 17. At this time the pressure port 130 will be connected to port 50 leading to port 46 at the upper end of the vertical slide cylinder 45 to cause downward movement of slide 42. Fluid from the lower end of the cylinder will return through channel 49 which has a hydraulic resistance coil 137 permits flow to port 47 but stops return flow therefrom whereby the returning fluid has to be forced through the hydraulic resistance 137 to port 51 of control valve 52. This hydraulic resistance sets up a certain resistance to downward movement of the vertical slide and prevents sudden dropping thereof. The port 51 is connected to port 139 and return channel 140.

The downward movement of the vertical slide will continue until it hits the positive stop 141. The horizontal slide control valve 63 is carried by the vertical slide and at the time of the downward movement thereof the plunger 64 of the valve 63 is in the position shown in Figure 10 and held in that position by the pivoted bell crank latch lever 142 against the compression spring 143. A continuously acting spring 144 tends to continuously maintain the latch lever 142 in the position shown. Upon downward movement of the vertical slide, however, the trip end 145 of the bell crank engages an adjustable dog 146 mounted in the T-slot 147 formed on the column of the machine, thereby withdrawing the latch 142 and permitting the spring 143 to move the plunger 64 upward. The tripping of lever 145 takes place just prior to the vertical slide engaging the positive stop 141 to insure continuous automatic operation of the machine. When the plunger 64 moves upward it connects the pressure port 125 to port 62 and channel 60 through which the fluid flows to the left hand end of the horizontal slide operating cylinder 55 through the port 57.

The slide 41 now moves toward the right until a rotatable cam 148 carried thereby hits a fixed roller 149 carried by the vertical slide. This cam has a lobe 150 which is so formed as to stop the movement of the cutter just short of engagement with the work. The cam 148 is secured to the end of a rotatable shaft 151 which, as shown in Figures 5 and 10, has a worm wheel 152 secured to the end thereof in engagement with a worm 153 carried by a shaft 154. This shaft is journaled in the bracket 83 parallel to the drive shaft 82 and has a gear 155 keyed thereon in mesh with the gear 156 formed on the periphery of the shifter member 184. When the clutch member 84 is in a neutral position no rotation will be imparted to the cam 48 which is the case at the time that the cam 148 hits the roller 149. This constitutes a positive stop, however, and the pressure in the left hand end of cylinder 55 will immediately build up to cause a flow past the relief valve 127 in the channel 126 and to the clutch control valve 107. The plunger 108 of this valve is shifted by a lever 157 pivotally mounted on an oscillatable shaft 158 journaled in the end of the horizontal slide as shown in Figure 8. Fixed to one end of this shaft are a pair of trip levers 159 and 160 which lie in spaced parallel planes for actuation by dogs 161 and 162 respectively which are mounted on the dog wheel 163. This dog wheel or drum is mounted for free rotation on the stud shaft 164 as shown in Figure 4 and has integral therewith the worm wheel 165 meshing with the worm 166 which is shown in Figure 5 as secured to the end of drive shaft 82. The ratio between the worm and worm wheel 166, 165 is such that the drum 163 makes less than one complete revolution for slightly more than a complete revolution of the cutter spindle carrying sleeve 37.

A third trip lever 167 is secured to the other end of shaft 158 and projects between two opposed plungers 168 and 169. The plunger 169 has a trip element 170 on the lower end thereof for engagement with the trip dog 171 which is carried by the vertical slide. It will be recalled that the shaft 158 and associated parts are carried by the horizontal slide so that the trip element 170 is actually the moving part while the dog 171 is the fixed part. Upon axial movement of the trip element 170 by the dog, the shaft 158 will be rotated sufficiently to move the valve plunger 108 to its left hand position and couple the pressure line 126 to port 105. A three-position detent mechanism including the spring pressed detent lever 172 will maintain the valve plunger in this position.

The fluid delivered to port 105 will flow through the channel 103 to cylinder 101 and thereby shift the clutch member 84 to the right to its low speed position thereby initiating rotation of shaft 82 which will cause rotation of the cutter spindle eccentrics and of the dog wheel 163. Also rotation of the clutch member 84 will effect rotation of the gear 56 carried thereby and through the inter-connected mechanism shown in Figure 10 will cause rotation of the cam 150.

As the cam 150 rotates simultaneously with the rotation of the cutter spindle eccentrics, the cutters will be gradually moved into the work along a sort of spiral path until the proper depth has been reached, at which time the slide 41 will engage the positive stop 173, the cam 148 then being out of engagement with the roller 149. This movement will continue until the sleeves 37 have made a complete revolution, at which time the dog 162 on the drum 63 will have rotated clockwise as viewed in Figure 10 to a position engaging the trip dog causing movement of the valve plunger 108 to a neutral position. At the same time a trip dog 174 carried by the drum wheel rotates the bell crank 175 which is connected by a link 176 to a bell crank 177 having one arm engaging a socket 178 formed in the upper end of the valve plunger 64. This will cause downward movement of the plunger 64 to the position shown in Figure 10 whereby the pressure port 125 will be connected through port 61, channel 59, port 58 to the right hand end of cylinder 55, causing return movement of the horizontal slide 41.

Just prior to the termination of this movement, a latch dog 179 carried by the horizontal slide will engage one end 180 of the bell crank 181 which is normally held in the position shown in Figure 10 against the stop pin 182 by a spring 183, and which serves to latch the lever 153 when shifted to the right by the solenoid 131 against the resistance of spring 184 through the trip lever 185 having one end engaging a slot 186 formed in the plunger 53. When the end 180 is moved up by dog 179, the bell crank 181 will rotate out of the path of lever 185, and permit the spring 184 to shift the valve plunger 153 to the left and thereby connect pressure port 130 to the port 51. The fluid will now flow through valve 138 and channel 49 to the lower end of the vertical slide cylinder 45 causing the same to move upward and withdraw the cutters from the work.

The vertical slide carries a latch dog 187 which is adapted to engage the indexing wheel 188 secured to the end of a horizontal shaft 189 and effect a quarter of a revolution thereof during each upward movement of the slide. To insure this, a spring pressed detent 190 engages a star wheel 191 fixed with the shaft. This shaft carries an oval shaped cam member 192, the major axis of which is adapted to alternately close the switches 20 and 21 while the minor axis serves to open said switches. It will thus be obvious that upon each quarter revolution of shaft 189 one of the switches will be opened and the other one closed, these switches serving to initiate the indexing movement of the rotatable table after each cutting cycle. In the position of the parts shown in Figure 10, the switch 20 has just been closed which completes the circuit from the main line 23 through the switch 20, line 193 to the switch point 194 which at this time is connected by the switch 19 and line 18 to the indexing motor 13. The indexing movement of the table will continue in a counterclockwise direction as viewed in Figure 10 until the control dog 195 throws the switch 19 over on to contact 196. This contact is connected by line 197 to the switch point 198 of switch 21 which is now open and therefore the indexing movement will stop.

As the slide moved upward, another trip lever 199 carried thereby engaged a trip dog 200 and it operated through the link 201 and bell crank 202, the vertical plunger 168 thereby rotating the shaft 158 to a position causing shifting of valve 108 to a rapid return position. In other words, the pressure channel 126 was connected to channel 104 to shift the clutch 84 to rapid return position and cause return movement of the eccentrics and the drum 163 and the cam 148 to reposition these parts for a new cycle. When this return movement has been completed, a dog 203 carried by the dog 163 will close switch 133, thereby completing the circuit from line 134 through switch 132 which will not be closed until the indexing movement of the table has been completed. Thus by means of the switches 132 and 133 which are in series, there is a positive insurance that the next cycle of operation of the cutters will not start until all the parts have been moved to a return position.

What is claimed is:

1. In a machine tool the combination of an indexible table, a cutting tool movable in one direction along a nonrectilinear path to a working position with respect to said table, power operable mechanism for indexing said table including a control switch, means operable by the tool during return movement along said path to close said switch and thereby initiate indexing of the table, and a second switch trip operable by the table to terminate said indexing movement.

2. In a machine tool the combination of an indexible table, a tool slide movable in one direction along a nonrectilinear path to a working position with respect to said table, power operable means for moving said slide including a reversing mechanism, electrically operable means for indexing said table including a control switch, means operable by the tool during return movement along said path to close said switch and thereby initiate indexing of the table, a second switch trip operable by the table to terminate said indexing movement, and means simultaneously operable by the table with said second switch for actuating said reversing mechanism to change the direction of movement of the slide.

3. In a machine tool the combination of an indexible table, a tool carrying slide movable toward and from the table, electrically operable means for indexing said table, a control circuit for said means including a first switch mechanism adjacent the table, a second switch mechanism adjacent the slide, parallel lines extending between said switch mechanisms, a pair of supply mains, means connecting the first mentioned switch mechanism to one of said mains, means connecting the second switch mechanism to the other of said mains, and means operable by successive movements of the tool slide away from the table for actuating the second switch to alternately connect the parallel lines to one power main to initiate successive indexing movements of the table and means operable by the table on the first switch mechanism to disconnect the connected parallel line to terminate indexing movement of the table.

4. In a machine tool the combination of an indexible table, a tool carrying slide mounted for vertical movement toward and from the table, electrically operable means for indexing said table, a control circuit for said means including a pair of switches adjacent the vertical slide adapted to be alternately closed to initiate successive indexing movements of the table, means operable by the table for opening said circuit to terminate said indexing movements, and an indexible cam operable by successive return movements of the slide for alternately closing said switches.

5. In a machine tool the combination of an indexible table, means for indexing said table, a tool carrying slide movable toward and from a working position adjacent the table between said indexing movements, fluid operable means for reciprocating said slide including a control valve, electrically operable means for shifting said valve to an operating position including a control switch adapted to be closed by said table at the termination of each indexing movement thereof, and latch means for holding said valve in its operating position.

6. In a machine tool the combination with an indexible rotary table, of a vertical slide movable toward and from the table for positioning a tool in operative relation to work carried by the table, fluid operable means for shifting said slide including a piston and cylinder, a source of fluid pressure, a control valve, parallel channels connecting opposite ends of the cylinder to said control valve, means for reversibly connecting said channels to said source of pressure and to exhaust, a check valve and a hydraulic resistance arranged in parallel in one of said channels whereby upon downward movement of said slide the exhaust fluid will be forced through said resistance to prevent inadvertent acceleration of the slide downward, said check valve being adapted to open so as to by-pass said resistance during upward movement of the slide.

7. In a machine tool the combination with an indexible work table, of a vertical slide movable toward and from the table, a horizontally movable slide mounted on the vertical slide, a cutting tool carried by the horizontal slide, fluid operable means for reciprocating the vertical slide including a source of pressure, a control valve having a first position for coupling said source to cause downward movement of the slide, subsequently operable means for moving the horizontal slide and thereby the tool into engagement with the work, electrical means operable by the table upon completion of an indexing movement for shifting said control valve to its first position, latch mechanism for holding said valve in its first position, and means trip operable by the horizontal slide during return movement thereof for releasing said latch mechanism to cause shifting of the control valve to a second position for initiating upward movement of the vertical slide.

8. In a machine tool having a work support and a rotatable cutter spindle, the combination of means for supporting and positioning said spindle relative to the work support including a quill, said quill having a longitudinal bore formed therein with its axis angularly intersecting the axis of said quill for receiving said spindle, a housing having a bore formed therein for receiving said quill, the axis of the bore in the housing being parallel to the axis of the spindle, and means for adjusting said quill longitudinally of the bore in said housing to effect lateral displacement of the cutter spindle.

9. A machine tool having a work support, a tool head for supporting a plurality of cutter spindles in adjacent relation to the work support, a plurality of quills mounted in said tool head for adjustment along axes inclined to the vertical, a cutter spindle journaled in each quill parallel to the vertical, and individual means for adjusting said quills longitudinally whereby the axis of said spindles may be laterally adjusted in predetermined, spaced relation to one another.

10. A machine tool having a work support, a tool support, a rotatable sleeve journaled in said support, a cutter spindle journaled in said sleeve eccentric to the axis thereof for planetary movement upon rotation of the sleeve, a continuously driven spindle transmission, a flexible connection from said transmission to the tool for maintaining a power coupling therewith during planetary movement thereof, parallel branch transmissions coupled to the spindle transmission for operation thereby, one at a relatively high speed and the other at a relatively low speed, and a clutch for selectively connecting either branch transmission to said rotatable sleeve to effect planetary movement of the tool at different rates.

11. A machine tool having a work support, a tool support, a rotatable sleeve journaled in said support, a cutter spindle journaled in said sleeve eccentric to the axis thereof for planetary movement upon rotation of the sleeve, a continuously driven spindle transmission, a flexible connection from said transmission to the tool for maintaining a power coupling therewith during planetary movement thereof, parallel branch transmissions coupled to the spindle transmission for operation thereby, one at a relatively high speed and the other at a relatively low speed, said branch transmissions terminating in oppositely driven members, a clutch selectively movable to a first position for coupling the slow driven member to the sleeve for effecting a planetary feeding movement of the tool; to a second position for coupling the rapid driven member to the sleeve to effect a rapid return movement of the tool; and to a third position for disconnecting both branch transmissions from the sleeve.

12. A machine tool having a work support, a tool support, a rotatable sleeve journaled in said support, a cutter spindle journaled in said sleeve eccentric to the axis thereof for planetary movement upon rotation of the sleeve, a continuously driven spindle transmission, a flexible connection from said transmission to the tool for maintaining a power coupling therewith during planetary movement thereof, parallel branch transmissions coupled to the spindle transmission for operation thereby, one at a relatively high speed and the other at a relatively low speed, said branch transmissions terminating in oppositely driven members, a clutch selectively movable to a first position for coupling the slow driven member to the sleeve for effecting a planetary feeding movement of the tool; to a second position for coupling the rapid driven member to the sleeve to effect a rapid return movement of the tool; to a third position for disconnecting both branch transmissions from the sleeve, and hydraulic means automatically operable for shifting said clutch to any one of its three positions.

13. A machine tool having a table for supporting a work piece thereon, a tool support having a rotatable cutter journaled therein, means for effecting relative movement between the tool support and the table for effecting engagement between the cutter and work, hydraulically operable means for rapidly effecting a major portion of said relative movement, cam means for controlling the rate of the remainder of said relative movement whereby the cutter will be brought into engagement with the work without shock, and a positive stop for ultimately determining the depth of cut to be made by said cutter.

14. In a planetary milling machine, a work support and a cutter support, a rotatable sleeve journaled in the cutter support, a tool spindle journaled in the sleeve eccentric to the axis thereof, a prime mover, a transmission coupling the spindle to the prime mover for continuous rotation thereby, a high speed and a low speed branch transmission continuously driven by the spindle transmission, said branch transmissions being driven in opposite directions, a selector clutch positionable to couple the slow speed branch transmission to said sleeve for effecting a planetary feed movement of the cutter, fluid operable means for shifting said clutch into engagement with the high speed branch transmission including a control valve, a dog wheel coupled for rotation with said rotatable sleeve, and trip means operable by said dog wheel for shifting said control valve to cause high speed return movement of the cutter spindle in a planetary path.

15. In a machine for finishing a circular bore in a work piece, the combination with a work support of a rotatable sleeve having an eccentric cutter spindle, a support for said sleeve, fluid operable means for moving the sleeve support and thereby the spindle into the bore to effect engagement of the cutter with the work, a mechanical power train for rotating the sleeve, a source of power for said train, and means responsive to movement of the sleeve member and effective upon engagement of the cutter with the work to connect said train to the source of power to cause rotation of the sleeve to finish said bore.

16. In a machine for finishing a circular bore in a work piece, the combination with a work support of a rotatable sleeve having an eccentric cutter spindle, a support for said sleeve, fluid operable means for moving the sleeve support and thereby the spindle into the bore to effect engagement of the cutter with the work, a mechanical power train for rotating the sleeve, a source of power for said train, means responsive to movement of the sleeve member and effective upon engagement of the cutter with the work to connect said train to the source of power to cause rotation of the sleeve to finish said bore, and means effective at slightly more than a complete revolution of the sleeve to effect withdrawal of the cutter spindle from the work by said fluid operable means.

17. In a machine tool having an indexible table, a carrier having a cutting tool supported therein, the combination of means for effecting relative movement between the table and carrier along a non-rectilinear path to position the parts in working relation, fluid operable means for effecting said relative movement, power operable mechanism for indexing said table including a control switch therefor, and means trip operable by one of the movable parts during relative movement along said path in an opposite direction to close said switch and initiate an indexing movement of the table.

18. In a machine tool having a work table and a tool carrier, the combination of fluid operable means for effecting a relative movement between the carrier and table to a working position including a control valve, electrically operable means for indexing said table, additional electrically operable means for shifting said valve to an operating position including a control switch, and means trip operable by the table at the termination of each indexing movement to cause energization of the last named electrically operable means and shifting of said valve.

MILLARD ROMAINE.
ERWIN G. ROEHM.